United States Patent
Cody (12)

(10) Patent No.: US 6,170,293 B1
(45) Date of Patent: Jan. 9, 2001

(54) LEHR ROLL CLEANING APPARATUS

(75) Inventor: Bryan Cody, Saline, MI (US)

(73) Assignee: New Hudson Corporation, New Hudson, MI (US)

( * ) Notice: Under 35 U.S.C. 154(b), the term of this patent shall be extended for 0 days.

(21) Appl. No.: 09/237,080

(22) Filed: Jan. 25, 1999

(51) Int. Cl.[7] .............................. B08B 13/00; C03B 35/18
(52) U.S. Cl. .................................. 65/168; 65/194; 15/52; 15/354; 198/495; 198/496
(58) Field of Search ................................. 65/27, 95, 99.2, 65/114, 118, 168, 182.3, 194, 349; 134/7, 172, 198; 198/493, 494, 495, 496, 497, 498, 499; 15/52, 354; 193/37

(56) References Cited

U.S. PATENT DOCUMENTS

| | | | |
|---|---|---|---|
| 3,083,551 | 4/1963 | Pilkington | 65/32 |
| 3,337,320 | 8/1967 | Dyck | 65/27 |
| 3,481,727 | 12/1969 | Dickinson et al. | 65/168 |
| 4,042,364 | 8/1977 | King et al. | 65/168 |
| 4,208,754 | 6/1980 | Hille | 15/88 |

*Primary Examiner*—Sean Vincent
(74) *Attorney, Agent, or Firm*—Gifford, Krass, Groh, Sprinkle, Anderson & Citkowski, PC

(57) ABSTRACT

In situ lehr-roll cleaning apparatus includes a carriage supported within the space between first and second adjacent rolls, the carriage having a first set of elements contacting the surface of the first roll and a second set of elements contacting the surface of the second roll, whereby the carriage is movable back and forth along a path parallel to the rolls. A mechanism such as a rotating wire wheel disposed on the carriage is used to clean at least one of the first and second rolls as the carriage moves along the path and in between the adjacent rolls. The invention further including means for forcing the carriage away from an adjacent roll toward the one being cleaned so that the elements contacting the surface of the roll being cleaned are forced thereagainst to precisely position the cleaning mechanism relative to the surface. Means are preferably further provided for fine-adjusting the distance of the cleaning mechanism relative to the surface of the roll being cleaned. The preferred apparatus further includes a dust cover disposed over the carriage, and air-inlet and air-output ports formed through the cover to provide a recirculating air path to remove particulates and cool the apparatus.

20 Claims, 5 Drawing Sheets

LEHR ROLL CLEANING APPARATUS

FIELD OF THE INVENTION

This invention relates generally to the in-situ maintenance of materials handling equipment and, in particular, to apparatus for cleaning lehr rolls of the type used to carry float glass.

BACKGROUND OF THE INVENTION

Most flat glass is today manufactured by the float production method, developed in England in the late 1950s. The float process has virtually eliminated production methods, such as sheet or plate glass manufacture. Float glass is made in a float tank, which once placed into operation, is operational 24 hours per day until it is refurbished, which can occur up to a decade later.

The manufacturing process can be broken down into five main stages. The first is the batching of raw materials. In the case of soda lime glass, the main ingredients are silica sand, calcium oxide, soda and magnesium. The components are weighed and mixed into batches to which recycled glass (cullet) is added.

Next the raw materials are loaded into a furnace where they become molten at a temperature of approximately 1550° C. The molten glass "floated" onto a bath of molten tin at a temperature of about 1000° C., forming a large ribbon. The glass is highly viscous and the tin is very fluid. As such, the floating glass does not mix with the tin and the contact surface between the two materials is perfectly flat.

On leaving the bath of molten tin, the glass, now at a temperature of about 600° C., has sufficiently cooled to pass into an annealing chamber called a lehr. Within the lehr, the cooling rate of the ribbon is controlled to obtain annealed material free of internal mechanical stresses, enabling the ribbon to be cut and worked. After cooling, the glass undergoes quality checks prior to being cut into sheets, which are stacked or stored for transport. A conventional apparatus for producing float glass is illustrated and described in U.S. Pat. No. 3,083,551.

The newly formed ribbon of glass is advanced through the annealing lehr on driven conveyor rolls which draw the glass ribbon along the molten metal bath. The glass, which is in a plastic condition as it enters the lehr, is subject to a defect known in the art as "roll print." Roll print is characterized by distortions or imperfections such as random surface rub marks, fissures, and, in some cases, fractures.

Roll print is often caused by the mechanical contact of the glass ribbon with the lehr conveyor rolls. In time, the rolls tend to accumulate uneven and crusty surface deposits which imprint on the soft undersurface of the newly formed glass ribbon. It is believed that such deposits are formed on the rollers through the collection of oxides, as well as dross and other foreign matter adhering to the soft undersurface of the glass ribbon.

Attempts have been made in the past to remove these crusty deposits from the surfaces of such conveyor rolls in situ. U.S. Pat. No. 3,337,320 teaches a method of removing deposits from the surfaces of lehr rolls by steam. U.S. Pat. No. 3,481,727 discloses the use of a reciprocating abrasive tool for abrading and brushing the crusty deposits from the surfaces of conveyor rolls.

U.S. Pat. No. 4,042,364, describes a system to remove impacted deposits from the surfaces of moderately encrusted conveyor rolls using a floor-mounted mechanism. However, the apparatus is complex and of heavy construction to provide the brushing forces required to remove tenacious deposits from heavily encrusted conveyor rolls. Additionally, since the space between the lehr rolls and the floor is of a very limited height, use of such an approach is not feasible in all circumstances.

U.S. Pat. No. 4,208,754 addresses this problem by providing an off-line lehr conveyor roll cleaning apparatus. The system comprises a mobile lower main unit having a pair of rotating roll supporting stations, one at either of its ends, and an upper removable unit which includes a longitudinally reciprocal, rotary brushing wheel. The lower main unit may include heater devices for heating the roll while it is being cleaned in order to maintain its temperature so that the surface encrustations can better be removed and/or it can be reinstalled in an operating lehr immediately after being cleaned without the usual preheating step.

Although removal of the conveyor roll may ease maintenance of the roll itself, roll removal is not recommended in most cases. Due to its maturity, the manufacture of float glass is a highly competitive process, such that down time must be monitored carefully to maximize throughput and maintain acceptable levels of profitability. Removal of the rollers, though conducive to a high level of surface cleaning, often leads to excessive disruption. The still remains, therefore, for a simple but effective in situ conveyor roll cleaning method and apparatus.

SUMMARY OF THE INVENTION

The subject invention improves upon the prior art by providing in situ roll cleaning apparatus supported within the space between adjacent rolls, thereby consuming little volume in the lehr. More particularly, with respect to a lehr having plurality of parallel, spaced-apart cylindrical rolls used to support a sheet of float glass, roll cleaning apparatus according to the invention includes a carriage supported within the space between first and second adjacent rolls, the carriage having a first set of elements contacting the surface of the first roll and a second set of elements contacting the surface of the second roll, such that the carriage is movable back and forth along a path parallel to the rolls. The invention further includes a mechanism disposed on the carriage for cleaning at least one of the first and second rolls as the carriage moves along the path and in between the adjacent rolls.

The roll-contacting elements, which may take the form of cylindrical or spherical rollers, are preferably supported on one or more pivoting arms, with the apparatus further including means such as a spring for biasing the arms toward the carriage. This forces the carriage away from the roll adjacent the one being cleaned, causing the elements contacting the roll being cleaned to bear against the roll being cleaned. The intimate and controlled contact of the elements against the roll being cleaned precisely positions those portions of the carriage containing the roll-cleaning mechanism with respect to the roll being cleaned, enabling very accurate alignment of the cleaning mechanism relative to the surface of the roll.

The precise positioning of the cleaning mechanism relative to the surface of the roll being cleaned allows the use of mechanisms requiring precise positioning to maintain the roll without scoring, including scrapers or "doctor" blades, rotating cutters or wire wheels, and abrasive particle sprayers. The preferred embodiment also features a fine-adjustment mechanism for further controlling the distance of cleaning device relative to the surface of the roll being cleaned, having forced the elements against the roll being cleaned. In particular, the shaft of the wire wheel extends through a rotatable plate having an eccentric central aperture, such that rotation of the plate causes the wire wheel to move relative to the roll being cleaned.

The preferred apparatus also includes a dust cover disposed over the carriage, and air-inlet and air-output ports formed through the cover, to provide a recirculating air path to cool the inner working of the carriage and remove particulates generated through roll cleaning. The motive power source used to operate the cleaning mechanism is preferably disposed externally of the carriage, with a flexible cable or linkable drive segments being employed to couple the motive power source to the mechanism as the carriage is positioned at different points along its path. The drive cable or shaft may be surrounded by an outer sheath, in which case additional space within the sheath may be used as one of the air-inlet or -outlet paths. In the preferred embodiment, compressed air is forced through the space within the sheath to cool components within the sheath or shafting.

DETAILED DESCRIPTION OF THE INVENTION

Figure 1:
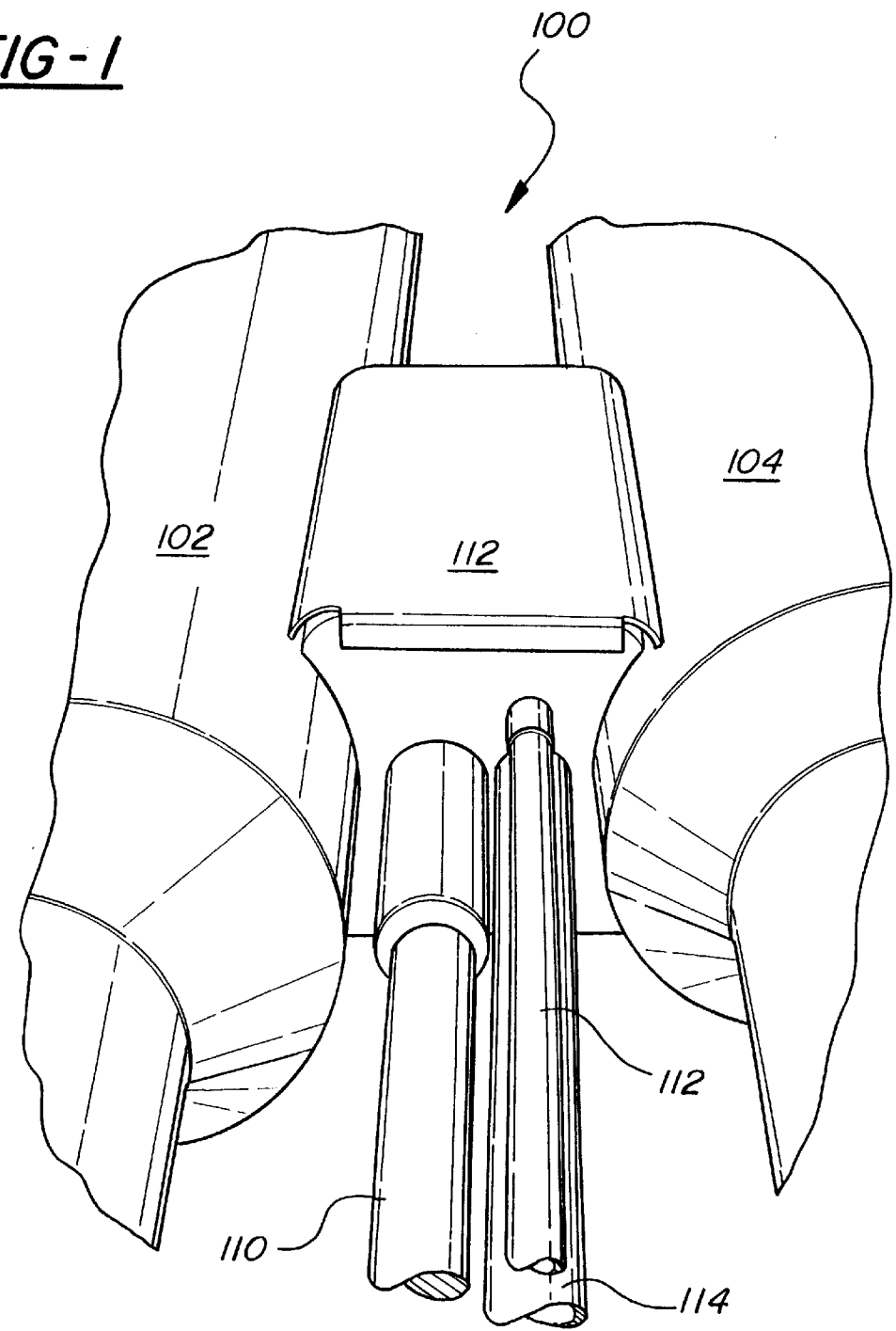
FIG. 1 is an oblique view of adjacent rolls in a lehr which shows how apparatus according to the invention is preferably supported therebetween.

Reference is now made to the figures, wherein FIG. 1 in particular illustrates how apparatus according to the invention, shown generally at 100, is supported between adjacent lehr rolls 102 and 104 according to a preferred embodiment. The apparatus includes a carriage supporting a roll-cleaning mechanism, preferably in the form of a rotating wire brush urged against the roll being cleaned. Other roll-cleaning mechanisms may alternatively be employed, including scrapers or "doctor" blades, rotating cutters, and abrasive particle sprayers.

Figure 2:
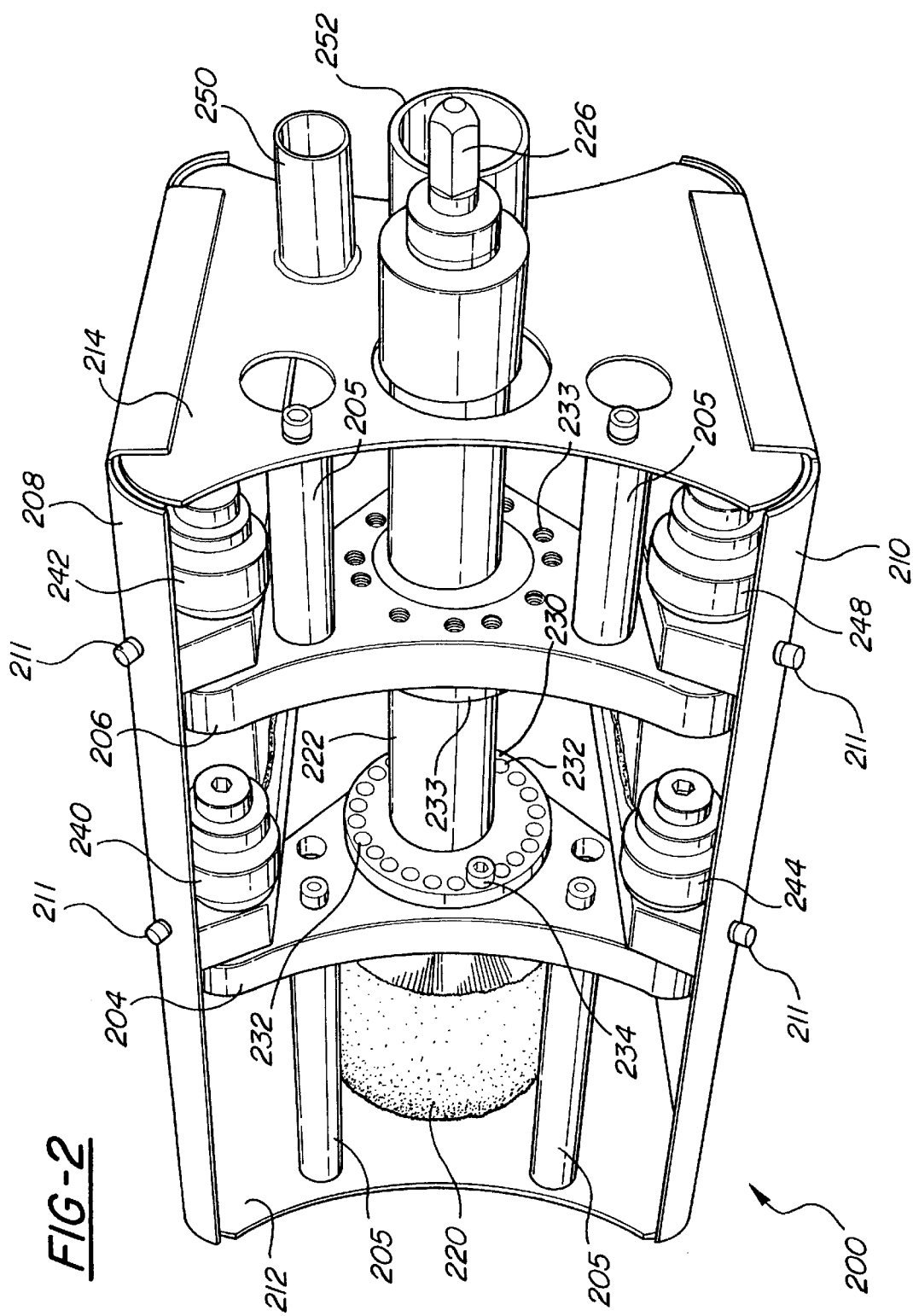
FIG. 2 is an oblique view of a translatable carriage according to the invention including a wire wheel used to clean a lehr roll.
Figure 3:
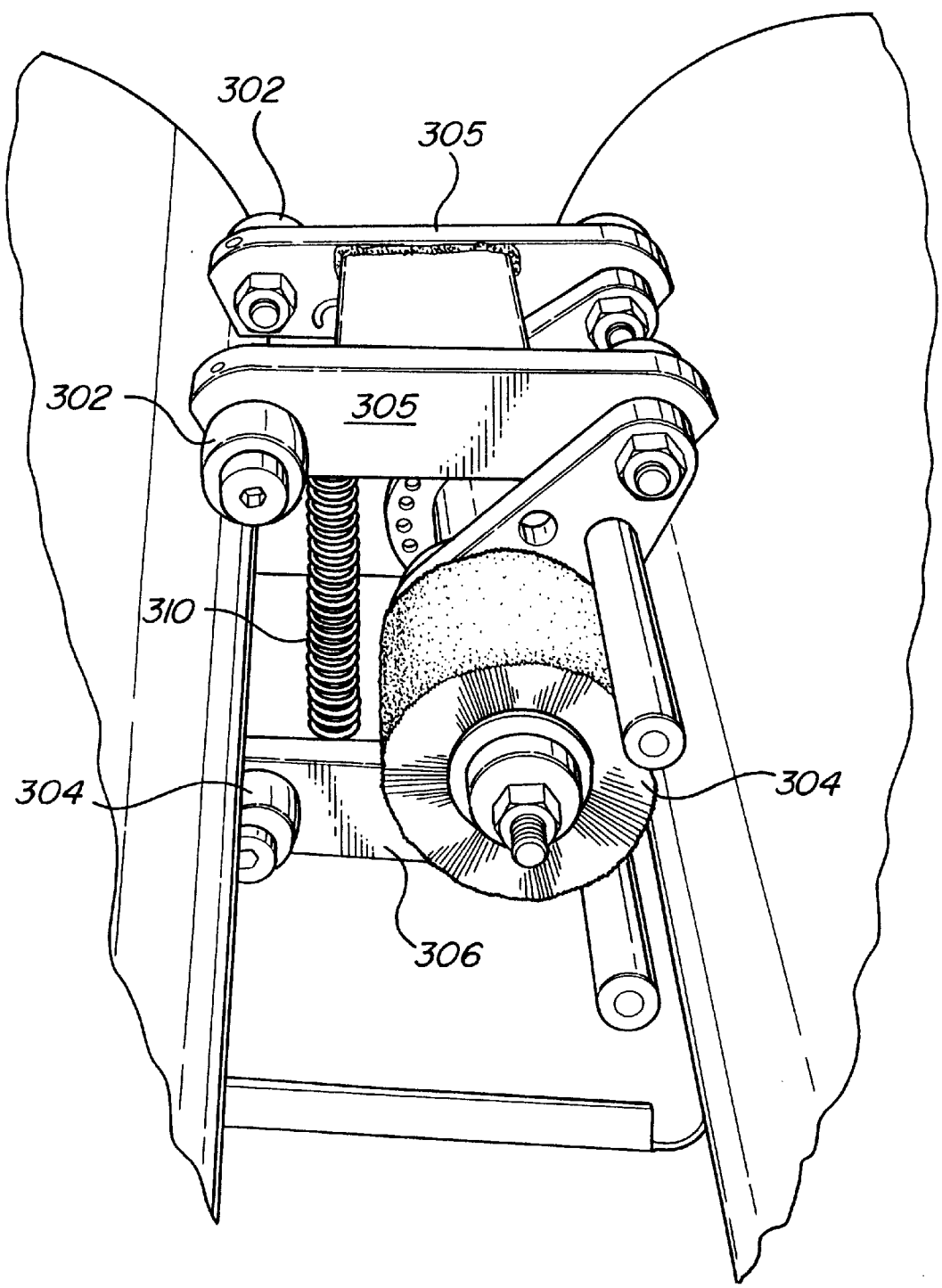
FIG. 3 is a side-view cross-section of the carriage of FIG. 2 showing how the rotatable wire wheel is adjustably biased against the roll being cleaned in a preferred embodiment.
Figure 4:
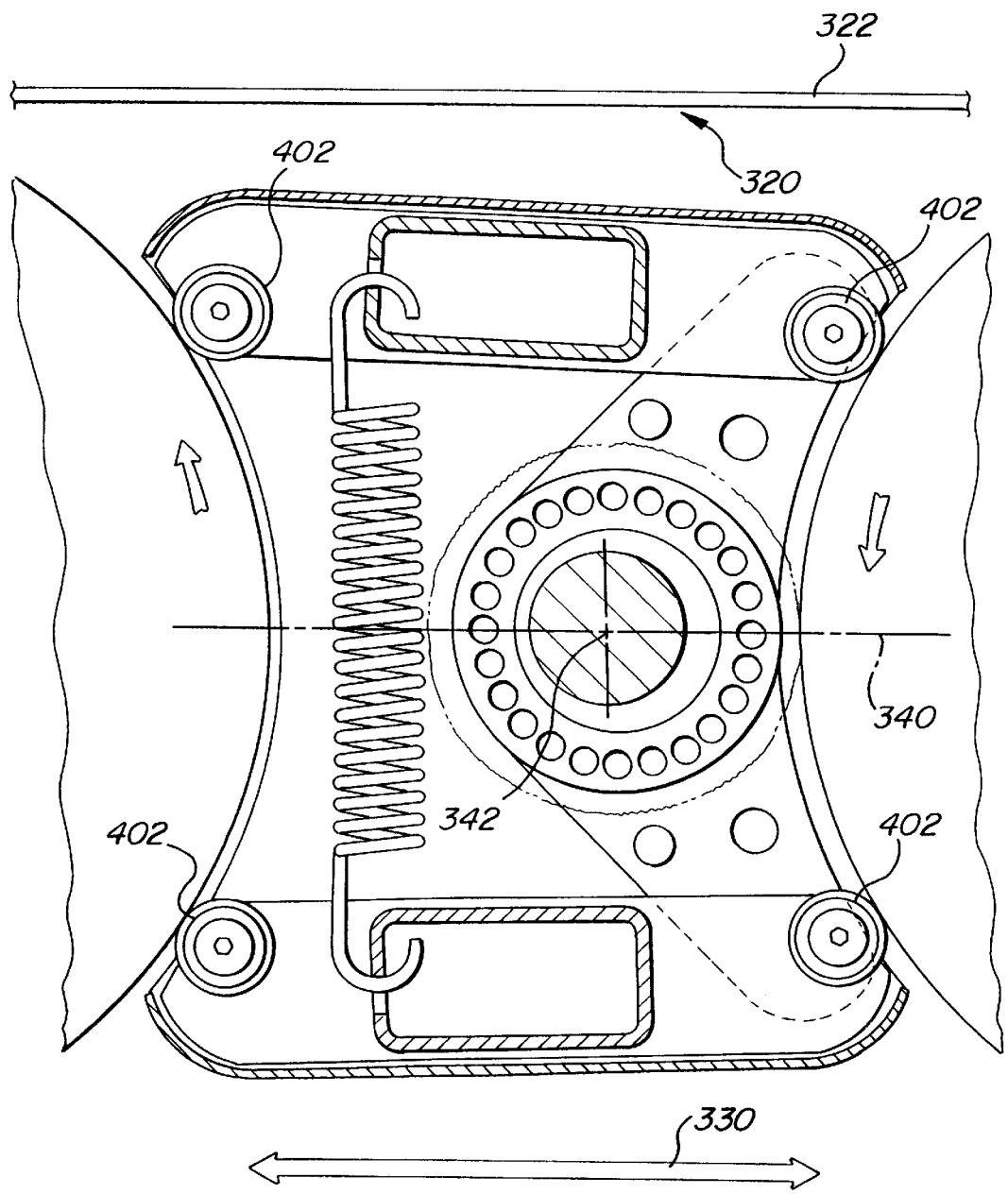
FIG. 4 represents an alternative embodiment wherein ball-and-socket elements are used in place of rollers as roll-contacting elements.

As better understood with respect to FIGS. 2 through 4, the carriage includes roll-contacting elements enabling the carriage to be suspended between adjacent rolls and moveable along a path parallel to the longitudinal axis of the rolls. The motive power source used to turn the wire wheel is preferably positioned externally of the carriage, with rotating link segments 110 being used to couple rotational power to the wheel as the carriage is moved back and forth within the space between adjacent rolls.

In an existing implementation, a 1-HP motor (nominal) is used to rotate the wire brush in the range of 5,000 rpm, more or less. The carriage is preferably encased in a cover 112, enabling air-inlet and air-outlet ports 112 and 114 to cool the inner workings of the carriage and cleaning mechanism and/or carry away particulate matter generated through the roll-cleaning process. Preferably a vacuum is attached to port 114 to draw particulate matter away from the enclosed carriage. In the event the drive cable or shaft is surrounded by an outer sheath, any additional space within the sheath is preferably used as an air-inlet path to cool the inner workings of the drive shaft mechanisms.

FIG. 2 presents a view of the carriage of FIG. 1 with the cover removed to show the various elements therein. Although it will be appreciated that the carriage may be constructed according to different approaches, in the preferred embodiment, support members 204 and 206 are used to define the basic structure. The members 204 and 206 have curved sides 204' and 206' which are conformal to the outer surfaces of a standard lehr roll, which typically has an outer diameter of 12" (though diameters of 8" and 8.5"0 are also common). Bolted to the members 204 and 206 are stand-offs 205 to which end panels 212 and 214 are affixed. Top and bottom covers 208 and 210 are mounted to the members 204 and 206 using fasteners 211.

The embodiment of FIG. 2 uses a set of small rollers 240, 242, 244 and 248 which make rolling contact to the outer surface of the roll being cleaned. A corresponding set of rollers are positioned on the other side of the carriage, not visible in FIG. 2, which ride on the surface of the adjacent roll. As shown in FIG. 4, as an alternative to rollers, balls in sockets may also be employed. In any case, whereas the elements contacting the roll being cleaned are supported for rotation about axes which are fixed relative to the carriage, at least a pair of the elements contacting the adjacent roll used for support purposes are preferably supported on pivoting arms or jaws. This aspect of the invention is perhaps best seen in FIG. 3, wherein rollers 302 and 304 are respectively supported on arms 305 and 306.

A spring 310 or other biasing means is preferably employed to pull the arms 305 and 306 toward one another. This forces the carriage away from the roll adjacent the one being cleaned, causing the elements contacting the roll being cleaned to bear against the roll being cleaned. The intimate and controlled contact of the elements against the roll being cleaned precisely positions those portions of the carriage containing the roll-cleaning mechanism with respect to the roll being cleaned (to the right in FIG. 3), enabling very accurate alignment of the cleaning mechanism relative to the surface of the roll.

The precise positioning of the cleaning mechanism relative to the surface of the roll being cleaned allows the use of mechanisms requiring precise positioning to maintain the roll without scoring. The preferred embodiment also features a fine-adjustment mechanism for further controlling the distance of cleaning device relative to the surface of the roll being cleaned, having forced the elements against the roll being cleaned. Making reference to FIG. 2, a brush 220 is rotated by a drive shaft 226 extending through the members 204 and 206 and outwardly of the enclosed space, forming a linkable interconnection to elements 110. In the preferred embodiment the outer sheath 222 extends through the members 204 and 206 through rotatable plates 230 and 233, each of which has a circular outer shape and a circular inner shape which is eccentric with respect to the outer shape. Each plate has a plurality of spaced apart mounting holes such as 232, such that the plates may be rotated and locked into position with fasteners 234, thereby precisely adjusting a final positioning of the brush relative to the surface of the roll being maintained.

FIG. 4 is similar to FIG. 3, except that in place of rollers, ball-and-socket elements such as 402 are used for roll contacting. FIG. 4 also shows how the carriage is preferably configured for disposition entirely within the space between adjacent rolls. That is, if the plane tangent to the upper extent of the parallel rolls defines an upper plane 320 wherein the glass 322 is being carried, and the plane tangent to the lower extent of the rolls defines a bottom plane 330, the carriage is preferably contained entirely within these two planes, enabling the carriage to be turned upside down to clean the opposite roll without interfering with the sheet of glass 322 regardless of orientation. In addition, if the plane which intersects the longitudinal axis of each roll is defined as a mid-plane 340, the axis of the brush 342 is preferably within this plane as well, as shown in FIG. 4, in particular.

Figure 5:
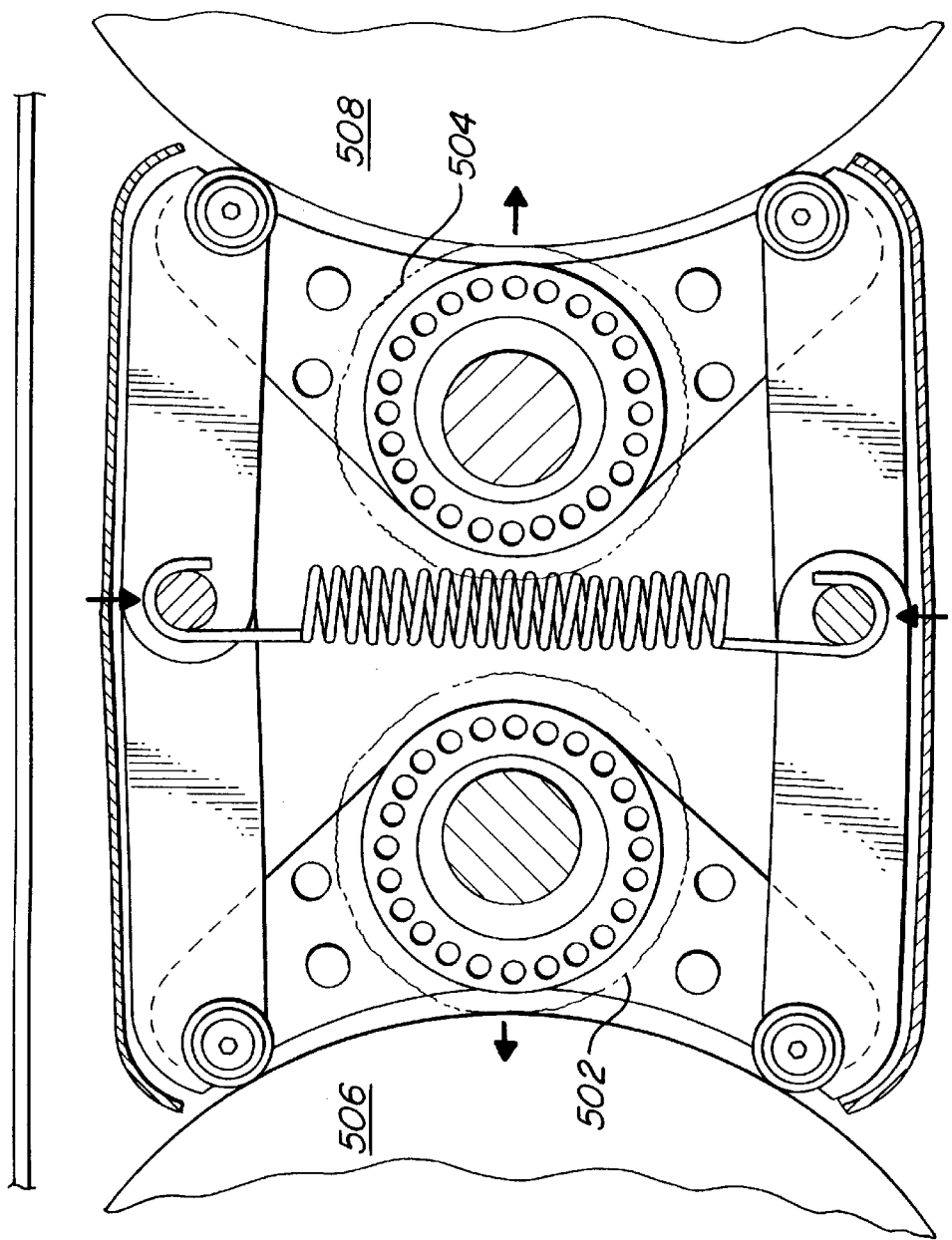
FIG. 5 illustrates yet a further alternative configuration wherein a scissors configuration is used to urge two brushes against adjacent rolls for simultaneous cleaning of both rolls.

FIG. 4 also helps to illustrate how the biasing mechanism automatically adjusts to apply a desired degree of brush pressure. In particular, note that whereas the jaws are substantially parallel in FIG. 3, the jaws are slightly more spread in FIG. 4 due to a closer proximity of the adjacent rolls. FIG. 5 illustrates yet a further alternative configuration wherein a scissors configuration is used to urge two brushes 502 and 504 against adjacent rolls 506 and 508 for simultaneous cleaning of both rolls.

I claim:

1. In a lehr having plurality of parallel, spaced-apart cylindrical rolls used to support a sheet of glass, roll cleaning apparatus comprising:
    a carriage supported within the space between first and second adjacent rolls, the carriage having a first set of elements contacting the surface of the first roll and a second set of elements contacting the surface of the second roll, whereby the carriage is movable back and forth along a path parallel to the rolls; and
    a mechanism disposed on the carriage other than the first and second set of contacting elements for cleaning at least one of the first and second rolls as the carriage moves along the path.

2. The apparatus of claim 1, wherein the elements contacting the surfaces of the rolls are smaller rollers.

3. The apparatus of claim 1, wherein the elements contacting the surfaces of the rolls are balls retained within sockets.

4. The apparatus of claim 1, further including:
    a dust cover disposed over the carriage; and
    air-inlet and air-output ports formed through the cover to provide a recirculating air path.

5. The apparatus of claim 1, wherein the elements contacting the surface of the roll adjacent the roll being cleaned are supported on a pair of pivoting arms, the apparatus further including means for biasing the arms so that the elements contacting the roll being cleaning are forced thereagainst.

6. The apparatus of claim 1, wherein the mechanism for cleaning at least one of the rollers further includes a rotatable wire wheel positioned relative to the surface of the roll being cleaned.

7. The apparatus of claim 6, further including means for adjusting the distance of the wire wheel relative to the surface of the roll being cleaned.

8. The apparatus of claim 7, wherein the means for adjusting the distance of the wire wheel relative to the roll being cleaned includes an eccentrically adjustable plate associated with the mounting of the wire wheel.

9. The apparatus of claim 6, further including a motive power source disposed externally of the carriage to rotate the wire wheel.

10. The apparatus of claim 9, further including a plurality of linkable drive segments to couple the motive power source to the drive wheel when the carriage is positioned at different points along the path.

11. The apparatus of claim 1, wherein the mechanism used to clean the roll is an abrasive particle sprayer.

12. Apparatus for cleaning cylindrical rolls of the type used to carry a sheet of float glass through a lehr, each roll being rotatable about its own longitudinal axis, with a plurality of the rolls being arranged in a spaced-apart manner such that their axes are parallel and substantially equidistant from one another, the plane tangent to the upper extent of each roll wherein the glass sheet is supported defining an upper plane, the plane tangent to the bottom extent of each roll defining a lower plane, and the plane intersecting the axis of each roll defining a mid-plane, the roll-cleaning apparatus comprising:
    a carriage configured to travel in the space between first and second adjacent rolls and beneath the upper plane, the carriage including a first set of rollers contacting the surface of the first roll and a second set of rollers contacting the surface of the second roll, the rollers enabling the carriage to move back and forth along a path parallel to the axes of the cylinders; and
    a mechanism disposed on the carriage other than the first and second set of contacting elements to clean one or both of the rolls as the rolls rotate and the carriage moves back and forth along the path.

13. The apparatus of claim 12, wherein the rollers are cylindrical.

14. The apparatus of claim 12, wherein the rollers are spherical.

15. The apparatus of claim 12, further including:
    a dust cover disposed over the carriage; and
    air-inlet and air-output ports formed through the cover to provide a recirculating air path to remove any particulates generated through the cleaning of the roll.

16. The apparatus of claim 12, wherein the rollers are supported on a pair of pivoting arms, the apparatus further including a spring for biasing the arms toward one another so that the mechanism associated with roll cleaning is urged against the roll being cleaned.

17. The apparatus of claim 12, wherein the mechanism for cleaning at least one of the rollers further includes a rotatable wire wheel urged against the surface of the roll being cleaned.

18. The apparatus of claim 17, further including means for adjusting the pressure of the wire wheel against the roll being cleaned.

19. The apparatus of claim 17, further including a motive power source disposed externally of the carriage to rotate the wire wheel.

20. The apparatus of claim 1, wherein the mechanism used to clean the roll is an abrasive particle sprayer.

* * * * *